US007037634B2

(12) United States Patent
Aylward et al.

(10) Patent No.: US 7,037,634 B2
(45) Date of Patent: May 2, 2006

(54) POLYMER FOAM SURFACE SMOOTHING MATERIALS AND METHOD

(75) Inventors: Peter T. Aylward, Hilton, NY (US); Narasimharao Dontula, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/789,871

(22) Filed: Feb. 27, 2004

(65) Prior Publication Data

US 2005/0191569 A1 Sep. 1, 2005

(51) Int. Cl.

| | |
|---|---|
| ***G03C 1/795*** | (2006.01) |
| ***G03C 1/765*** | (2006.01) |
| ***G03C 1/93*** | (2006.01) |
| ***B32B 27/00*** | (2006.01) |
| ***B32B 3/26*** | (2006.01) |

(52) U.S. Cl. ...................... 430/201; 430/496; 430/531; 430/536; 156/244.11; 156/244.23; 156/244.24; 156/244.27; 428/32.17; 428/32.2; 428/305.5; 428/318.8; 428/319.3

(58) Field of Classification Search ................ 430/201, 430/496, 536, 531; 428/32.17, 32.2, 305.5, 428/318.8, 319.3; 156/244.11, 244.23, 244.24, 156/244.27

See application file for complete search history.

(56) References Cited

U.S. PATENT DOCUMENTS

| | | | |
|---|---|---|---|
| 3,299,192 | A | 1/1967 | Lux |
| 3,864,444 | A | 2/1975 | Johnson |
| 4,098,941 | A | 7/1978 | Johnson |
| 4,456,571 | A | 6/1984 | Johnson |
| 4,832,775 | A | 5/1989 | Park et al. |
| 5,084,334 | A | 1/1992 | Hamano et al. |
| 5,277,852 | A | 1/1994 | Spydevold |
| 5,667,740 | A | 9/1997 | Spydevold |
| 5,674,442 | A | 10/1997 | Morita |
| 5,851,651 | A | 12/1998 | Chao |
| 5,866,282 | A | 2/1999 | Bourdelais et al. |
| 6,077,065 | A | 6/2000 | Sumiyoshi et al. |
| 6,447,976 | B1 | 9/2002 | Dontula et al. |
| 6,514,659 | B1 | 2/2003 | Dontula et al. |
| 6,514,660 | B1 | 2/2003 | Majumdar et al. |
| 6,537,656 | B1 | 3/2003 | Dontula et al. |
| 6,566,033 | B1 | 5/2003 | Majumdar et al. |
| 2003/0031747 | A1 | 2/2003 | Becker |
| 2003/0031748 | A1 | 2/2003 | Becker |
| 2003/0036479 | A1 | 2/2003 | Majumdar et al. |
| 2003/0073577 | A1 | 4/2003 | Majumdar et al. |
| 2003/0118750 | A1 | 6/2003 | Bourdelais et al. |
| 2003/0118807 | A1 | 6/2003 | Laney et al. |
| 2003/0123150 | A1 | 7/2003 | Brickey et al. |
| 2003/0128313 | A1 | 7/2003 | Kaminsky et al. |
| 2003/0152760 | A1 | 8/2003 | Lai et al. |
| 2003/0219610 | A1 | 11/2003 | Aylward et al. |
| 2003/0219663 | A1 | 11/2003 | Sunderrajan et al. |
| 2003/0232188 | A1 | 12/2003 | Savage et al. |

FOREIGN PATENT DOCUMENTS

| | | | |
|---|---|---|---|
| EP | 1 285 741 | A1 | 2/2003 |
| EP | 0 838 321 | B1 | 12/2003 |
| JP | 2839905 | B2 | 12/1998 |
| JP | 3308733 | B2 | 7/2002 |
| WO | 99/12722 | | 3/1999 |

OTHER PUBLICATIONS

EP01890228.8 application, filed Jul. 2, 2001, now publication EP1285741A1.
Japanese Abstract JP04-327937.
Japanese Abstract JP08-132415.
Japanese Abstract JP09-106038.
Japanese Abstract JP09-127648.
Japanese Abstract JP10-249915.
Japanese Abstract JP11-023814.
To RC or Not to RC, Crawford, Gray and Parsons, Journal of Photographic Engineering, pp. 110-117 (1979).
Co-pending USSN, Aylward et al., *Surface Roughness Frequency To Control Pits On Foam Core Imaging Supports*, (D-84886).

*Primary Examiner*—Richard L. Schilling
(74) *Attorney, Agent, or Firm*—Lynne M. Blank

(57) ABSTRACT

The present invention relates to an imaging element comprising at least one imaging layer and a base. The base comprises a foam core layer, which comprises a polymer that has been expanded through the use of a blowing agent, and at least one polymeric surface smoothing layer, which comprises a solution polymer.

40 Claims, No Drawings

POLYMER FOAM SURFACE SMOOTHING MATERIALS AND METHOD

CROSS-REFERENCE TO RELATED APPLICATIONS

Reference is made to commonly assigned, co-pending U.S. patent application Ser. No. 10/788,964 filed of even date herewith entitled "SURFACE ROUGHNESS FREQUENCY TO CONTROL PITS ON FOAM CORE IMAGING SUPPORTS", the disclosure of which is incorporated herein.

FIELD OF THE INVENTION

The present invention relates to imaging media. In a preferred form, it relates to foam core imaging supports for photographic, ink jet, thermal, and electrophotographic media.

BACKGROUND OF THE INVENTION

In order for a print imaging support to be widely accepted by the consumer for imaging applications, it has to meet requirements for preferred basis weight, caliper, stiffness, smoothness, gloss, whiteness, and opacity. Supports with properties outside the typical range for 'imaging media' suffer low consumer acceptance.

Traditional photographic prints, as well as ink jet, thermal and all other reflective imaging methods need to have a smooth surface in order to provide the image viewer with a visually pleasing surface that provides uniform gloss and reflective properties. When prints have a high level of roughness, light will reflect off the surface at different angles in relation to the viewer and therefore present an unappealing image. Such a rough surface may also result in nonuniform exposure of photographic images and result in images that are not sharp.

Another consideration is the opacity of a reflective support. Adequate opacity prevents the show through of the reflective image below the one being viewed in a stack of images or the non white surface that the reflective image is resting on or to which the image is mounted. Given the fact that ink jet, thermal, and most high end imaging media were derived from and are now in competition with photographic imaging media, the need for comparable degrees of opacity becomes necessary.

In addition to these fundamental requirements, imaging supports are also subject to other specific requirements, depending upon the mode of image formation on the support. For example, in the formation of photographic paper, it is important that the photographic paper be resistant to penetration by liquid processing chemicals. In the formation of 'photo-quality' ink jet paper, it is important that the paper is readily wetted by ink and that it exhibits the ability to absorb high concentrations of ink and dry quickly. For thermal media, it is important that the support contain an insulative layer in order to maximize the transfer of dye from the donor that results in higher color saturation.

Additionally, there is a need for imaging prints that are light in weight and that are sufficiently stiff to provide the consumer with not only a visually appealing print but also one that feels substantial and not flimsy. High stiffness is also desirable in order to resist curl. This is particularly important for photographic prints in which the gelatin of the photographic emulsion develops a very high modulus in low relative humidity conditions that cause the print to curl towards the image layer.

It is important, therefore, for an imaging media to simultaneously satisfy several requirements. One commonly used technique in the art for simultaneously satisfying multiple requirements is through the use of composite structures comprising multiple layers wherein each of the layers, either individually or synergistically, serves distinct functions. Multiple operations are typically required to manufacture and assemble all of the individual layers into a single support. For example, it is known that a conventional photographic paper comprises a cellulose paper base that has applied thereto layers of polyolefin resin, typically polyethylene, on each side, which serve to provide waterproofing to the paper and also provide a smooth surface on which the photosensitive layers are formed. U.S. Pat. No. 5,866,282, discloses biaxially oriented polyolefin sheets extrusion laminated to cellulose paper to create a support for silver halide imaging layers. The composite imaging support structure described has been found to be more durable, sharper, and brighter than prior art photographic paper imaging supports that use cast melt extruded polyethylene layers coated on cellulose paper. In U.S. Pat. No. 5,851,651, porous coatings comprising inorganic pigments and anionic, organic binders are blade coated to cellulose paper to create 'photo-quality' ink jet paper. Photographic paper typically requires a paper making operation followed by a polyethylene extrusion coating operation, or as disclosed in U.S. Pat. No. 5,866,282, a paper making operation is followed by a lamination operation for which the laminates are made in yet another extrusion casting operation. There is a need for imaging supports that can be manufactured in a single in-line manufacturing process while still meeting the stringent features and quality requirements of imaging bases.

It is also well known in the art that traditional imaging bases consist of raw paper base. Although raw paper base is typically a high modulus, low cost material, there exist significant environmental issues with the paper manufacturing process. There is a need for alternate raw materials and manufacturing processes that are more environmentally friendly and minimize environmental impact, without sacrificing the imaging base features that are valued by the customer, that is, strength, stiffness, and surface properties of the imaging support. In addition, existing composite paper structures are typically subject to curl through the manufacturing, finishing, and processing operations, leaving a need for an imaging support that minimizes curl sensitivity as a function of humidity, or ideally, does not exhibit curl sensitivity.

Recently, attempts have been made to replace paper support the use of closed cell foam core imaging elements, as described in U.S. Pat. Nos. 6,447,976, 6,514,659, 6,537,656, 6,566,033 and U.S. Patent Application 2003/0152760A1. The 'polymer foams' have previously found significant application in food and drink containers, packaging, furniture, and appliances. Polymer foams have also been referred to as cellular polymers, foamed plastic, or expanded plastic. Polymer foams are multiple phase systems comprising a solid polymer matrix that is continuous and a gas phase. For example, U.S. Pat. No. 4,832,775 discloses a composite foam/film structure which comprises a polystyrene foam substrate, oriented polypropylene film applied to at least one major surface of the polystyrene foam substrate, and an acrylic adhesive component securing the polypropylene film to the major surface of the polystyrene foam substrate. The foregoing composite foam/film structure may be shaped by conventional processes as thermoforming to provide numerous types of useful articles including cups, bowls, and plates, as well as cartons and containers that exhibit excellent levels of puncture, flex-crack, grease and abrasion resistance, moisture barrier properties, and resiliency.

Foams have also found limited application in layers in combination with paper or other support for imaging media. For example, JP 2839905 B2 discloses a 3 layer structure comprising a foamed polyolefin layer on the image receiving side, raw paper base, and a polyethylene resin coat on the backside. The foamed resin layer was created by extruding a mixture of 20 weight % titanium dioxide master batch in low density polyethylene, 78 weight % polypropylene, and 2 weight % of Daiblow PE-M20 (AL)NK blowing agent through a T-die. This foamed sheet was then laminated to the paper base using a hot melt adhesive. The disclosure JP 09127648 A highlights a variation of the JP 2839905 B2 structure, in which the resin on the backside of the paper base is foamed, while the image receiving side resin layer is unfoamed. Another variation is a 4 layer structure highlighted in JP 09106038 A, in which the image receiving resin layer comprises 2 layers, an unfoamed resin layer which is in contact with the emulsion, and a foamed resin layer which is adhered to the paper base.

Approaches are known in the art of preparing resin coated paper imaging supports with a specific smoothness. For example, in Application EP 0952483, a paper support for photographic printing having a pigmented coating based on clay and/or other pigment and an average surface roughness $R_A$ of 1.0 μm or less, is provided with at least one pigmented polymer resin layer. This application is specific to paper bases that are resin coated but there are limitations resulting from the properties of the paper bases. The smoothness of the base paper is reportedly increased by calendering the paper at high pressures between metallic rolls. Limitations of this method are that calendering will reduce the thickness of the base paper and result in a decrease of whiteness and stiffness. In addition, this high pressure calendering method has been attempted to suppress the crater defects by increasing the thickness of the polymer resin coating layer. At high extrusion speeds, such as over 300 m/min this is not sufficiently effective. With higher coverage, features with longer wavelengths are filled or leveled more. However, at some point, it is not economical to apply higher and higher resin coverage, as the increase in polymer resin thickness increases production costs of photographic printing paper. JP-B 06-048365 discloses coating the base paper sheet followed by gloss calendering prior to the melt extrusion coating of titanium oxide filled polymer resin. According to this patent, the gloss of the photographic paper is related to the gloss of the base paper. This latter value is improved by providing a pigmented surface coating on the base paper followed by a gloss super-calender treatment, prior to laminating with the titanium oxide filled polymer resin. The required high gloss value was achievable by providing more than 50 wt. % of kaolin in the pigmented surface coating.

Unlike paper supports, foam support is typically so rough that very high coverage of the extrusion polymer is required to provide the necessary smoothness desired by the consumers. Commercially available foam cores are several times rougher than conventional imaging paper bases. Typically paper bases for imaging support have a roughness of from 0.6 to 1.4 microns while foams are typically at least from 2 to 4.5 microns. Conventional resin coated paper has a resin coverage of from 24 to 29 g/m$^2$ to produce the desired roughness of the final image but conventional foam cores need to be coated with 58 to 75 g/m$^2$ to achieve acceptable roughness. Foam supports also suffer from surface pits and craters as a result of the foaming process. An alternative approach for smoothing closed cell foam core is needed as a result of the inherent roughness of the closed cell foam core.

PROBLEM TO BE SOLVED BY THE INVENTION

In the art of providing imaging base supports, there remains a need for high speed production of low cost, light weight, stiff support, which produces a low density closed cell foam core with sufficiently low number of defects, particularly pit or crater defects, in the support.

SUMMARY OF THE INVENTION

The present invention relates to an imaging element comprising at least one imaging layer and a base. The base comprises a foam core layer, which comprises a polymer that has been expanded through the use of a blowing agent, and at least one polymeric surface smoothing layer, which comprises a solution polymer.

ADVANTAGEOUS EFFECT OF THE INVENTION

The present invention includes several advantages, not all of which are incorporated in a single embodiment. This invention provides a superior imaging support. Specifically, it provides an imaging support that is light in weight and has high surface smoothness. The support may also advantageously be free of pits and craters on the surface of the image and/or have a pleasing surface reflection to the image. Other embodiments may also demonstrate high stiffness, high opacity, whiteness, and excellent humidity curl resistance and may eliminate disadvantages in the manufacturing of the current generation of imaging supports including very tight moisture specifications in the raw base and specifications to minimize pits during resin coating.

DETAILED DESCRIPTION OF THE INVENTION

The invention relates to a closed cell foam imaging element that has a very smooth surface. The closed cell foam core of the present invention comprises an imaging element having an imaging layer and a base with a foam core polymer that has been expanded through the use of a blowing agent layer and at least one polymeric surface smoothing layer. Preferably, these polymers which comprise the smoothing layer are solution coated polymers. The imaging member of the invention may further optionally comprise an upper and a lower flange layer.

The terms as used herein, “top”, “upper”, “emulsion side”, and “face” mean the side or towards the side of an imaging member bearing the imaging layers. The terms “bottom”, “lower side”, and “back” mean the side or towards the side of the imaging member opposite from the side bearing the imaging layers or developed image. The term “substrate” as used herein refers to a support or base material that is the primary part of an imaging element such as paper, polyester, vinyl, synthetic paper, fabric, or other suitable material for the viewing of images. The term “flange” refers to a layer applied to a core layer to form one integral unit, such as a support. The term “core” refers to the central, centermost or most predominant layer of a base or support.

The polymer foam core comprises a homopolymer such as a polyolefin, polystyrene, polyvinylchloride or other typical thermoplastic polymers, their copolymers or their blends thereof, or other polymeric systems like polyurethanes, and polyisocyanurates, that has been expanded through the use of a blowing agent to consist of two phases, a solid polymer matrix, and a gaseous phase. Other solid phases may be present in the foams in the form of fillers that are of organic (polymeric, fibrous) or inorganic (glass, ceramic, metal, pigment) origin. The fillers may be used for physical, optical (lightness, whiteness, and opacity), chemical, or processing property enhancements of the foam.

The foaming of these polymers may be carried out through several mechanical, chemical, or physical means. Mechanical methods include whipping a gas into a polymer melt, solution, or suspension, which then hardens either by catalytic action or heat or both, thus entrapping the gas bubbles in the matrix. Chemical methods include such techniques as the thermal decomposition of chemical blowing agents, generating gases such as nitrogen or carbon dioxide by the application of heat or through exothermic heat of reaction during polymerization. Physical methods include such techniques as the expansion of a gas dissolved in a polymer mass upon reduction of system pressure, the volatilization of low-boiling liquids such as fluorocarbons or methylene chloride, or the incorporation of hollow microspheres in a polymer matrix. The choice of foaming technique is dictated by desired foam density reduction, desired properties, and manufacturing process.

In a preferred embodiment of this invention, polyolefins, such as polyethylene and polypropylene, their blends and their copolymers, are used as the matrix polymer in the foam core along with a chemical blowing agent such as sodium bicarbonate and its mixture with citric acid, organic acid salts, azodicarbonamide, azobisformamide, azobisisobutyrolnitrile, diazoaminobenzene, 4,4'-oxybis(benzene sulfonyl hydrazide) (OBSH), N,N'-dinitrosopentamethyltetramine (DNPA), sodium borohydride, and other blowing agents well known in the art. The preferred chemical blowing agents would be sodium bicarbonate/citric acid mixtures, or azodicarbonamide, although others may also be used. If necessary, these foaming agents may be used together with an auxiliary foaming agent, nucleating agent, and a crosslinking agent.

Some factors that may impact the surface roughness of the closed cell foam are the speed of the process, the surface finish of the roller, and the density of the foam core. Lower density foam cores typically will have a higher surface roughness than higher density foam cores. However, if an imaging element that is lower in cost is desired, very low densities, such as 0.2 to 0.8 g/cc, would be most cost effective.

The suitable range in caliper of the foam core is from 25 μm to 250 μm. The preferred caliper range of the foam core is from 50 μm to 200 μm because of the preferred overall caliper or thickness range of the element, lies from 100 μm to 400 μm. The range in density reduction of the foam core is from 20% to 95%. The preferred range in density reduction is from 40% to 70%. This is because it is difficult to manufacture a uniform product with very high density reduction (over 70%). Typically, with high levels of density reduction, the surface of the foam core becomes very rough and non-uniform. Even when a layer of melt extrudable polymer is placed on one or both sides of the low density foam core, the surface often is still very rough. While some smoothing occurs, it is not sufficient to provide the smoothness expected in high quality printing of images and text, for example, within the 0.6 to 1.4 micron range. Text or images placed on top of such a rough surface will have areas of missing print, pits or a non-uniform color density that makes the image less desirable from the viewers standpoint. Density reduction is the percent difference between solid polymer and a particular foam sample. It is also not economical to manufacture a product with density reduction less than 40%.

In addition to the stiffness and caliper, an imaging element needs to meet constraints in surface smoothness and optical properties such as opacity and colorimetry. Commercially available polymeric foam core typically will have a roughness of 2.0–4.5 microns and when a melt extrudable flange is coated on top of the core, the roughness average is typically between 1.6–2.3 microns for flange coverages between 12–35 g/m$^2$. Imaging elements with roughness in this range have pits and are not desirable. It is possible with higher coverages to improve the overall roughness to minimize pits but it becomes less cost effective in material cost. Also, the speed at which the flange layers can be extruded is adversely impacted. Additionally higher coverages on one side of an imaging element may have to be balanced on the opposite side for curl performance.

When an image layer is applied to on top of the flange with this degree of roughness, it is very common to see numerous pits. The pits visually appear as an area that has a different gloss than the surrounding area. By providing the foam core that has a roughness of between 2.0–4.5 microns with a smoothing layer prior to being flange coated with a melt extrudable resin, the overall roughness of the final imaging element can be improved to the point where pits are not a concern (typically less than 1 micron). The smoothing layer provides a means of partially filling many of the deep rough features so as to lower the surface roughness features to the point that the melt extrudable flange coverage can be significantly reduced. Such a reduction in flange coverage may result in improved cost performance as well as the manufacturing speed at which the foam core can be run through the machine. This becomes a consideration when a high quality, low cost synthetic substrate is used to replace conventional resin coated paper.

While the improved smoothness is important for all imaging elements, it is especially important for images that are formed using pressure such as thermal dye sublimation or crushable dye capsules. With these types of imaging elements, having a base that is not only smooth but also has some compressability becomes a consideration is making high quality images free from skips, pits and also that have excellent color density. In a preferred embodiment, the foam core with smoothing layer and, optionally, melt extruded flange has an average roughness of from 0.1 μm to 1.1 μm. If the smoothness of the foam core and smoothing layer can be made near 1 micron or less, then a melt extruded flange may not be required. In those cases where the flange layer is needed for additional stiffness or opacity, the smoothing layer thickness may be kept to a minimum for cost considerations. In another embodiment, the foam core has an average roughness of between 1.4–2.5 μm. Foam cores in this range are easier to manufacture and can be smoothed with a solution coatable smoothing layer prior to being flange coated. The final roughness of the image element may be in the 0.1–1.1 μm for best results. Smoothness below 0.1 while very acceptable are not cost effective while roughness above 1.1 μm may start to have a few pits. In another preferred embodiment, the foam core has opacity greater than 90%. Increasing the opacity of the foam core is useful in reducing the pigment content of the smoothing layer and the melt extruded flange. This helps to reduce manufacturing problems during these coating processes as well as overall material cost.

In order to provide sufficient surface smoothness to make an imaging print, the imaging element of this invention comprises a closed cell foam core that further comprises at least one smoothing layer. The smoothing layer or layers and the method of application useful in this invention are chosen to provide surface filling and contour leveling. Additionally, such layers may also provide good adhesion to the closed cell foam core, as well as to any flange layers that are used, opacity to minimize show-through, whiteness to provide good contrast and color gamut, and added stiffness to minimize curl and give the consumer a pleasing sense of feel. It should be noted that adequate stiffness is needed to provide transport through photofinishing equipment.

The smoothing layer or layers comprise binder polymers. The smoothing layer binder polymers useful in this invention typically are solution polymers as opposed to melt extrudable polymers and may include film forming polymeric binders. It should be noted that high coverages or multiple layers of melt extrusion polymer may be used to improve the smoothness of the foam core sheet but are not considered to be an economical solution to the problem of rough surface. The smoothing layer binder polymers used in the invention may be applied from either aqueous or solvent coating compositions. The smoothing layer binder polymer used in the present invention may have recurring monomer units derived from oleophilic monomers. The term "oleophilic monomers", as used herein, refers to alpha, beta-ethylenically unsaturated hydrocarbon group containing monomers. Useful binders include interpolymers of ethylenically unsaturated monomers such as acrylic acid and its esters, methacrylic acid and its esters, styrene and its derivatives, acrylates, such as methyl acrylate, methyl methacrylate, ethyl acrylate, n-butyl acrylate, benzyl acrylate, n-hexyl methacrylate, 2-ethylhexyl methacrylate, methyl vinyl ether, chlorostyrene, vinyltoluene, vinyl chloride, vinylidene chloride, butadienes, maleic acid, itaconates, vinyl pyrrolidone, vinyl acetate, acrylamides and methacrylamides, and combinations and co-polymers thereof. Other useful binder polymers include gelatin, polyvinyl alcohol, polyvinyl butyral, cellulosics, polyurethanes, polyesters, epoxies, and the base neutralized, carboxylic acid-containing latex polymers.

The smoothing layers may be on one or both sides of the closed cell foam core. Typically during the casting of the foam core, there is one side that is rougher then the other. This may be related to the casting and quenching of the foam core and whether one side is cast onto a roller prior to the other side. Typically the smoother side is the side of the support that will bear the image.

With the addition of a polymeric smoothing layer, the modulus of the smoothing layer may add additional stiffness to the imaging element. This may be by the modulus of the smoothing layer or by an I-Beam effect, in which the high modulus flange layers are moved further from the center of bending and therefore provide additional stiffness to the imaging element. In a preferred embodiment, the smoothing layer comprises a polymer sheet. In another preferred embodiment, the smoothing layer may comprise biaxially oriented polyolefin sheets.

The smoothing layer used in the present invention may further include at least one pigment. Useful pigments may include inorganic materials, such as TiO2, BaSO4, clays, talcs, CaCO3, ZnO, Al2O3 or other pigments. In addition, such smoothing layers may further include addenda, including colorants, optical brighteners, foam control agents, viscosity modifiers, crosslinking agents, antioxidants and other coating aids known in the industry.

The smoothing layer binder polymers and pigments with other coating aids or addenda may be applied to the closed cell foam core in any manner and coating thickness to provide a resulting surface smoothness of less than 1.4 microns. When a melt extrudable flange layer is applied the surface smoothness prior to the addition of an imaging layer is most preferably between 0.1–1.0 microns. The foam core used in this invention typically will have a roughness of between 2 and 4.5 microns. The preferred embodiment is to provide a glossy imaging element with a smoothness of less than 1.1 micron after all the smoothing layers and flanges have been added. This is necessary to provide smoothness that is not mottley, defined as variation in observed density that may cause a blotchy appearance to the image, in appearance and is substantially free of pits. While foam cores with roughness greater than 4.5 microns can still be smoothed to provide a reasonable image, it becomes increasing difficult and less cost effective to provide the required smoothness using a solution coating process. Useful coating thickness of the flange may vary from 10–150 microns. Higher melt extruded flange coverages may be used but are not very cost effective. A preferred embodiment has a flange caliper of between 35–70 microns. Most preferably, the flange layers used with the present invention, have a caliper of from 35–58 microns, as conventional flange layers cannot function as surface smoothing layers below a caliper of approximately 58 microns.

Smoothing polymeric foam cores is very different than smoothing paper core support. Paper cores are much more water absorbing than polymeric foam cores and therefore the requirements of the smoothing layer may be different. Typically paper cores can be calendered or super-calendered to achieved a pre-smoothness of the base prior to applying other smoothing layers. Conventional photographic paper prior to coating with a melt extrudable layer has a roughness of approximately 1.5 microns. Paper typically has a relative high density (greater than 0.95 g/cc) and after calendaring the paper base is further densified to provide a very smooth surface prior to applying any additional smoothing layers. In some types of paper that have been refined and wet pressed for smoothness or that have been sized with a high viscosity surface size, calendaring may be sufficient to enable appropriate smoothness with just a melt extrusion polymer. With the use of low density polymeric foam cores, calendaring is not desirable because it tends to collapse the foam structure and defeat the purpose of achieving a low density core. Additionally since the foam core is polymeric and non-absorbing, the selection of binders used in the smoothing layer is different than what can be used for paper cores and should be matched to the foam core polymer to provide the required adhesion and wetting of the surface to assure good product and process performance.

In the case of polypropylenes, the surface may be primed prior to the addition of a smoothing layer. This may include but is not limited to surface energy modifications using corona, flame, plasma and atmospheric modified plasma treatment, chemical primers such as polyethyleneimine, copolymers of styrene acrylates, acrylics, polyurethanes, oleophilic monomers including UV and e-beam curable materials and others.

Additionally the application of solution-coated layers to polymeric foam cores also presents some problems. Polymeric materials do not wet as easily as paper and are prone to streaks, repellency and other problems. In other to handle these concerns, additional care is taken in the formula to assure proper wetting of the surface, leveling of the coated layer and controlled rate of drying. Surfactants known in the coated coating and paint industries may be useful. Typically the addition of surfactants, coating aids such as alcohols and coalescing aids may also be desirable. Since the binder part of the solution coated smoothing layers may be a latex, it may also be desirable to added UV and light stabilizers to minimize any degradation or change upon light exposure. Tints, colorants, opacifiers and optical brighteners may also be used to further enhance the performance of the imaging element.

When a solution coatable smoothing layer is applied to a rough surface, the layer will shrink when it is dried unless a UV or E-beam curable monomer are used. Since the low density foam core is very rough it is desirable to apply the smoothing layer at high solids to minimize shrinkage and provide optimum filling of the rough surface. The preferable smoothing layer formula will have a percent solids content of at least 40% by weight, preferably between 40 and 70% by weight. This is largely dependant on the method of coating. For blade coating, high solids content allows for less shrinkage and more filling of the surface topography. While the coating weight and corresponding thickness may be varied to get more or less filling of the surface, it is desirable to have a coverage range of between 10–30 $g/m^2$ dry coverage. It should be noted that when the surface roughness is very high (3.5 to 6.0 microns) it may be desirable to apply and dry more than one coating layer to provide smoothing that provides good viewing pleasure for images.

If the entire roughness features of the polymeric foam core are filled in with a solution coatable smoothing layer, it may be desirable to provide soft nip calendaring to help smooth the coated layer. As noted above, care needs to be taken to prevent or minimize crushing the foam core. The smoothing layer is preferably applied in such a manner as to maximize its leveling or smoothing effects. Blade coating is one preferred method to apply the smoothing layer. Such a method is preferred because it fills in the valley and minimizes what is applied to the peaks. In another preferred embodiment, the smoothing layer may be formed integrally with the foam core by manufacturing the foam core with a polymeric skin sheet or the smoothing layer may be laminated to the foam core material. The integral extrusion of the smoothing layer with the core is preferred for cost as compared to adding melt extrudable layers in separate operations. Other coating methods may include, but are not limited to, wound wire rod coating, slot coating, slide hopper coating, gravure, or curtain coating.

With some of the coating methods, it may be desirable to apply the coating in more than one step. Applying the coating in sequential steps or operations may be desirable to obtain improvement in coating defects at high speeds. A preferred process may comprise a means of making foam sheet, applying one or more solution coated smoothing layers, drying the layer(s) and then applying a melt extruded flange on one or both sides of the foam core. Additionally, the process may include printing a logo and coating a conductive layer for static control.

In another preferred embodiment, the smoothing layer may be applied between the closed cell foam core and a flange layer. In another embodiment, the smoothing layer may be located on top of the flange layer, that is, the flange layer is located between the closed cell foam core and the smoothing layer. In one embodiment, the rough surface of the closed cell foam core is further smoothed by the application of the flange layer to the smoothing layer. The element, while described as having a closed cell foam core with at least one smoothing layer, may also include a flange layer or, preferably, at least four layers of a foam core, smoothing layer and a flange layer on each side.

The flange layers of this invention are chosen to satisfy specific requirements of flexural modulus, caliper, surface roughness, and optical properties such as colorimetry and opacity. Imaging elements are constrained to a range in stiffness and caliper. At stiffness below a certain minimum stiffness, there is a problem with the element in print stackability and print conveyance during transport through photofinishing equipment, particularly high speed photoprocessors. It is believed that there is a minimum cross direction stiffness of 60 mN required for effective transport through photofinishing equipment. At stiffness above a certain maximum, there is a problem with the element in cutting, punching, slitting, and chopping during transport through photofinishing equipment. It is believed that there is a maximum machine direction stiffness of 300 mN for effective transport through photofinishing equipment. It is also important for the same transport reasons through photofinishing equipment that the caliper of the imaging element be constrained from 75 μm to 350 μm. Imaging elements are typically constrained as well by consumer performance and present processing machine restrictions to a stiffness range of from 50 mN to 250 mN and a caliper range of from approximately 100 μm to 400 μm. In the design of the element of the invention, there exists a relationship between stiffness of the imaging element and the caliper and modulus of the foam core and modulus of the flange layers, that is, for a given core thickness, the stiffness of the element may be altered by changing the caliper of the flange elements and/or changing the modulus of the flange elements and/or changing the modulus of the foam core. If the target overall stiffness and caliper of the imaging element are specified then for a given core thickness and core material, the target caliper and modulus of the flange elements are implicitly constrained. Conversely, given a target stiffness and caliper of the imaging element for a given caliper and modulus of the flange layers, the core thickness and core modulus are implicitly constrained. In a preferred embodiment, the foam core layer used in the present invention has a thickness of from 25 to 200 μm.

The selection of core material, the extent of density reduction (foaming), and the use of any additives/treatments for example, crosslinking the foam, determine the foam core modulus. The selection of flange materials and treatments (for example, the addition of strength agents, the use of filler materials for polymeric flange materials) determines the flange modulus. With the addition of a polymeric smoothing layer, the modulus of the smoothing layer may add additional stiffness to the imaging element. When optimizing the cost aspect of a foam core imaging element, it may be useful to reduce the total weight and thickness of the flange layer. Typically, the flange layers contain pigment and polymer and, in the case of an upper flange onto which imaging layers may be positioned, may contain expensive materials such as TiO2. In this case it may be desirable to reduce the total thickness of the flange by relying on the added stiffening impact of the smoothing layer thickness and modulus.

In another preferred lamination embodiment of this invention, the flange layers used comprise high modulus polymers such as high-density polyethylene, polypropylene, or polystyrene, their blends or their copolymers, that have been stretched and oriented. They may be filled with suitable filler materials to increase the modulus of the polymer and enhance other properties such as opacity and smoothness. Some of the commonly used inorganic filler materials are talc, clay, calcium carbonate, magnesium carbonate, barium sulfate, mica, aluminum hydroxide (trihydrate), wollastonite, glass fibers and spheres, silica, various silicates, and carbon black. Some of the organic fillers used are wood flour, jute fibers, sisal fibers, and polyester fibers. The preferred fillers are talc, mica, and calcium carbonate because they provide excellent modulus enhancing properties. Polymer flange layers useful to this invention are of caliper from 10 μm to 150 μm, preferably from 35 μm to 70 μm. It should be noted that the flange layer may also contain materials such as titanium dioxide and calcium carbonate and colorants, dyes and/or optical brighteners or other additives known to those skilled in the art.

The flange layers used in the invention may be made using several different manufacturing methods. The coextrusion, quenching, orienting, and heat setting of the element may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the foam core component of the element and the polymeric integral flange components are quenched below their glass solidification temperature. The flange components may be extruded through a multiple stream die with the outer flange forming polymer streams not containing foaming agent. Alternatively, the surface of the polymer that contains the foaming agent may be cooled to prevent surface foaming and form a flange. The quenched sheet may be biaxially oriented by stretching in mutually perpendicular directions at a temperature above the glass transition temperature and below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining, to some degree, the sheet against retraction in both directions of stretching.

Fillers may be present in the foam core, flange layers or an overcoat layer, such as polyethylene. Generally, base materials for color print imaging materials are white, possibly with a blue tint, as a slight blue is preferred to form a preferred white look to whites in an image. Any suitable white pigment may be incorporated in the flange layers such as, for example, titanium dioxide, zinc oxide, zinc sulfide, zirconium dioxide, white lead, lead sulfate, lead chloride, lead aluminate, lead phthalate, antimony trioxide, white bismuth, tin oxide, white manganese, white tungsten, and combinations thereof. The pigment is used in any form that is conveniently dispersed within the flange or resin coat layers. The preferred pigment is titanium dioxide. In addition, suitable optical brightener may be employed in the polyolefin layer including those described in *Research Disclosure*, Vol. No. 308, December 1989, Publication 308119, Paragraph V, page 998.

The element may also be provided with additional layers that may serve to change the properties of the element. Imaging elements could be formed with surface layers that would provide an improved adhesion or look. The additional layers may also be made through the extrusion laminating process. In one embodiment, extrusion laminating may be carried out by bringing together the flange layers and the foam core with application of an adhesive between them, followed by their being pressed in a nip such as between two rollers. The adhesive may be applied to either the flange layers or the foam core prior to their being brought into the nip. In a preferred form, the adhesive is applied into the nip simultaneously with the flange layers and the foam core. The adhesive may be any suitable material that does not have a harmful effect upon the element. A preferred material is polyethylene that is melted at the time it is placed into the nip between the foam core and the flange layer. Addenda may also be added to the adhesive layer. Any know material used in the art to improve the optical performance of the system may be used. The use of $TiO_2$ is preferred. During the lamination process also, it is desirable to maintain control of the tension of the flange layers in order to minimize curl in the resulting laminated receiver support.

In addition, it may be necessary to use various additives such as antioxidants, slip agents, or lubricants, and light stabilizers in the plastic elements, as well as biocides, in the elements. These additives are added to improve, among other things, the dispersibility of fillers and/or colorants, as well as the thermal and color stability during processing and the manufacturability and the longevity of the finished article. For example, the polyolefin coating may contain antioxidants such as 4,4'-butylidene-bis(6-tert-butyl-meta-cresol), di-lauryl-3,3'-thiopropionate, N-butylated-p-aminophenol, 2,6-di-tert-butyl-p-cresol, 2,2-di-tert-butyl-4-methyl-phenol, N,N-disalicylidene-1,2-diaminopropane, tetra (2,4-tert-butylphenyl)-4,4'-diphenyl diphosphonite, octadecyl 3-(3',5'-di-tert-butyl-4'-hydroxyphenyl propionate), combinations of the above, heat stabilizers, such as higher aliphatic acid metal salts such as magnesium stearate, calcium stearate, zinc stearate, aluminum stearate, calcium palmitate, zirconium octylate, sodium laurate, and salts of benzoic acid such as sodium benzoate, calcium benzoate, magnesium benzoate and zinc benzoate, light stabilizers such as hindered amine light stabilizers (HALS), of which a preferred example is poly[[6-[(1,1,3,3-tetramethylbutyl) amino]-1,3,5-triazine-2,4-diyl][(2,2,6,6-tetramethyl-4-piperidynl)-imino]-1,6-hexanediyl[(2,2,6,6-tetramethyl-4-piperdinyl)imino]](Chimassorb 944 LD/FL).

Used herein, the phrase 'imaging element' comprises an imaging support as described above along with an image receiving layer as applicable to multiple techniques governing the transfer of an image onto the imaging element. Such techniques include thermal dye transfer, electrophotographic printing, or ink jet printing, as well as a support for photographic silver halide images. As used herein, the phrase "photographic element" is a material that utilizes photosensitive silver halide in the formation of images.

The thermal dye image receiving layer of the receiving elements used with the invention may comprise, for example, a polycarbonate, a polyurethane, a polyester, polyvinyl chloride, poly(styrene-co-acrylonitrile), poly(caprolactone), or mixtures thereof. The dye image receiving layer may be present in any amount that is effective for the intended purpose. In general, good results have been obtained at a concentration of from 1 to 10 $g/m^2$. An overcoat layer may be coated over the dye receiving layer, such as described in U.S. Pat. No. 4,775,657 of Harrison et al.

Dye donor elements that are used with the dye receiving element used with the invention conventionally comprise a support having thereon a dye containing layer. Any dye may be used in the dye donor employed in the invention, provided it is transferable to the dye receiving layer by the action of heat. Especially good results have been obtained with sublimable dyes. Dye donors applicable for use in the present invention are described, for example, in U.S. Pat. Nos. 4,916,112, 4,927,803, and 5,023,228. As noted above, dye donor elements are used to form a dye transfer image. Such a process comprises image wise heating a dye donor element and transferring a dye image to a dye receiving element as described above to form the dye transfer image. In a preferred embodiment of the thermal dye transfer method of printing, a dye donor element is employed which compromises a poly(ethylene terephthalate) support coated with sequential repeating areas of cyan, magenta, and yellow dye, and the dye transfer steps are sequentially performed for each color to obtain a three color dye transfer image. When the process is only performed for a single color, then a monochrome dye transfer image is obtained.

Thermal printing heads which may be used to transfer dye from dye donor elements to receiving elements used with the invention are available commercially. There may be employed, for example, a Fujitsu Thermal Head (FTP-040 MCS001), a TDK Thermal Head F415 HH7-1089, or a Rohm Thermal Head KE 2008-F3. Alternatively, other known sources of energy for thermal dye transfer may be used, such as lasers as described in, for example, GB No. 2,083,726A.

A thermal dye transfer assemblage used with the invention comprises (a) a dye donor element, and (b) a dye receiving element as described above, the dye receiving element being in a superposed relationship with the dye donor element so that the dye layer of the donor element is in contact with the dye image receiving layer of the receiving element.

When a three color image is to be obtained, the above assemblage is formed on three occasions during the time when heat is applied by the thermal printing head. After the first dye is transferred, the elements are peeled apart. A second dye donor element (or another area of the donor element with a different dye area) is then brought in register with the dye receiving element and the process repeated. The third color is obtained in the same manner.

The electrographic and electrophotographic processes and their individual steps have been well described in the prior art. The processes incorporate the basic steps of creating an electrostatic image, developing that image with charged, colored particles (toner), optionally transferring the resulting developed image to a secondary substrate, and fixing the image to the substrate. There are numerous variations in these processes and basic steps, the use of liquid toners in place of dry toners is simply one of those variations.

The first basic step, creation of an electrostatic image, may be accomplished by a variety of methods. The electrophotographic process of copiers uses imagewise photodischarge, through analog or digital exposure, of a uniformly charged photoconductor. The photoconductor may be a single use system, or it may be rechargeable and reimageable, like those based on selenium or organic photoreceptors.

In one form, the electrophotographic process of copiers uses imagewise photodischarge, through analog or digital exposure, of a uniformly charged photoconductor. The photoconductor may be a single use system, or it may be rechargeable and reimageable, like those based on selenium or organic photoreceptors.

In an alternate electrographic process, electrostatic images are created ionographically. The latent image is created on dielectric (charge holding) medium, either paper or film. Voltage is applied to selected metal styli or writing nibs from an array of styli spaced across the width of the medium, causing a dielectric breakdown of the air between the selected styli and the medium. Ions are created, which form the latent image on the medium.

Electrostatic images, however generated, are developed with oppositely charged toner particles. For development with liquid toners, the liquid developer is brought into direct contact with the electrostatic image. Usually a flowing liquid is employed to ensure that sufficient toner particles are available for development. The field created by the electrostatic image causes the charged particles, suspended in a nonconductive liquid, to move by electrophoresis. The charge of the latent electrostatic image is thus neutralized by the oppositely charged particles. The theory and physics of electrophoretic development with liquid toners are well described in many books and publications.

If a reimageable photoreceptor or an electrographic master is used, the toned image is transferred to a support substrate. The support is charged electrostatically, with the polarity chosen to cause the toner particles to transfer to the support. Finally, the toned image is fixed to the support. For self-fixing toners, residual liquid is removed from the support by air drying or heating. Upon evaporation of the solvent, these toners form a film bonded to the support. For heat-fusible toners, thermoplastic polymers are used as part of the particle. Heating both removes residual liquid and fixes the toner to support.

When used as ink jet imaging media, the recording elements or media typically comprise a substrate or a support material having on at least one surface thereof an ink receiving or image forming layer. If desired, in order to improve the adhesion of the ink receiving layer to the support, the surface of the support may be corona discharge treated prior to applying the solvent absorbing layer to the support or, alternatively, an undercoating, such as a layer formed from a halogenated phenol or a partially hydrolyzed vinyl chloride-vinyl acetate copolymer, may be applied to the surface of the support. The ink receiving layer is preferably coated onto the support layer from water or water-alcohol solutions at a dry thickness ranging from 3 to 75 micrometers, preferably from 8 to 50 micrometers.

Any known ink jet receiver layer may be used in combination with the external polyester based barrier layer of the present invention. For example, the ink receiving layer may consist primarily of inorganic oxide particles such as silicas, modified silicas, clays, aluminas, fusible beads such as beads comprised of thermoplastic or thermosetting polymers, nonfusible organic beads, or hydrophilic polymers such as naturally occurring hydrophilic colloids and gums such as gelatin, albumin, guar, xantham, acacia, chitosan, starches and their derivatives, derivatives of natural polymers such as functionalized proteins, functionalized gums and starches, and cellulose ethers and their derivatives, and synthetic polymers such as polyvinyloxazoline, polyvinylmethyloxazoline, polyoxides, polyethers, poly(ethylene imine), poly(acrylic acid), poly(methacrylic acid), n-vinyl amides including polyacrylamide and polyvinylpyrrolidone, and poly(vinyl alcohol), its derivatives and copolymers, and combinations of these materials. Hydrophilic polymers, inorganic oxide particles, and organic beads may be present in one or more layers on the substrate and in various combinations within a layer.

A porous structure may be introduced into ink receiving layers comprised of hydrophilic polymers by the addition of ceramic or hard polymeric particulates, by foaming or blowing during coating, or by inducing phase separation in the layer through introduction of nonsolvent. In general, it is preferred for the base layer to be hydrophilic, but not porous. This is especially true for photographic quality prints, in which porosity may cause a loss in gloss. In particular, the ink receiving layer may consist of any hydrophilic polymer or combination of polymers with or without additives as is well known in the art.

If desired, the ink receiving layer may be overcoated with an ink permeable, antitack protective layer such as, for example, a layer comprising a cellulose derivative or a cationically modified cellulose derivative or mixtures thereof. An especially preferred overcoat is poly μ-1,4-anhydro-glucose-g-oxyethylene-g-(2'-hydroxypropyl)-N,N-dimethyl-N-dodecylammonium chloride. The overcoat layer is non porous, but is ink permeable and serves to improve the optical density of the images printed on the element with water based inks. The overcoat layer may also protect the ink receiving layer from abrasion, smudging, and water damage. In general, this overcoat layer may be present at a dry thickness of from 0.1 to 5 μm, preferably from 0.25 to 3 μm.

In practice, various additives may be employed in the ink receiving layer and overcoat. These additives include surface active agents such as surfactant(s) to improve coatability and to adjust the surface tension of the dried coating, acid or base to control the pH, antistatic agents, suspending agents, antioxidants, hardening agents to crosslink the coating, antioxidants, UV stabilizers, and light stabilizers. In addition, a mordant may be added in small quantities (from 2% to 10% by weight of the base layer) to improve waterfastness. Useful mordants are disclosed in U.S. Pat. No. 5,474,843.

The layers described above, including the ink receiving layer and the overcoat layer, may be coated by conventional coating means onto a transparent or opaque support material commonly used in this art. Coating methods may include, but are not limited to, blade coating, wound wire rod coating, slot coating, slide hopper coating, gravure, and curtain coating. Some of these methods allow for simultaneous coatings of both layers, which is preferred from a manufacturing economic perspective.

The DRL (dye receiving layer) is coated over the tie layer or TL at a thickness ranging from 0.1 to 10 μm, preferably from 0.5 to 5 μm. There are many known formulations, which may be useful as dye receiving layers. The primary requirement is that the DRL is compatible with the inks which it will be imaged so as to yield the desirable color gamut and density. As the ink drops pass through the DRL, the dyes are retained or mordanted in the DRL, while the ink solvents pass freely through the DRL and are rapidly absorbed by the TL. Additionally, the DRL formulation is preferably coated from water, exhibits adequate adhesion to the TL, and allows for easy control of the surface gloss.

For example, Misuda et al in U.S. Pat. Nos. 4,879,166, 5,264,275, 5,104,730, 4,879,166, and Japanese Patents 1,095,091, 2,276,671, 2,276,670, 4,267,180, 5,024,335, and 5,016,517 disclose aqueous based DRL formulations comprising mixtures of psuedo-bohemite and certain water soluble resins. Light in U.S. Pat. Nos. 4,903,040, 4,930,041, 5,084,338, 5,126,194, 5,126,195, and 5,147,717 discloses aqueous based DRL formulations comprising mixtures of vinyl pyrrolidone polymers and certain water dispersible and/or water soluble polyesters, along with other polymers and addenda. Butters et al in U.S. Pat. Nos. 4,857,386 and 5,102,717 disclose ink absorbent resin layers comprising mixtures of vinyl pyrrolidone polymers and acrylic or methacrylic polymers. Sato et al in U.S. Pat. No. 5,194,317 and Higuma et al in U.S. Pat. No. 5,059,983 disclose aqueous coatable DRL formulations based on poly(vinyl alcohol). Iqbal in U.S. Pat. No. 5,208,092 discloses water based DRL formulations comprising vinyl copolymers which are subsequently crosslinked. In addition to these examples, there may be other known or contemplated DRL formulations which are consistent with the aforementioned primary and secondary requirements of the DRL, all of which fall under the spirit and scope of the current invention.

The preferred DRL is from 0.1 to 10 micrometers thick and is coated as an aqueous dispersion of 5 parts alumoxane and 5 parts poly(vinyl pyrrolidone). The DRL may also contain varying levels and sizes of matting agents for the purpose of controlling gloss, friction, and/or fingerprint resistance, surfactants to enhance surface uniformity and to adjust the surface tension of the dried coating, mordanting agents, antioxidants, UV absorbing compounds, and light stabilizers.

Although the ink receiving elements as described above may be successfully used to achieve the objectives of the present invention, it may be desirable to overcoat the DRL for the purpose of enhancing the durability of the imaged element. Such overcoats may be applied to the DRL either before or after the element is imaged. For example, the DRL may be overcoated with an ink permeable layer through which inks freely pass. Layers of this type are described in U.S. Pat. Nos. 4,686,118, 5,027,131, and 5,102,717. Alternatively, an overcoat may be added after the element is imaged. Any of the known laminating films and equipment may be used for this purpose. The inks used in the aforementioned imaging process are well known, and the ink formulations are often closely tied to the specific processes, that is, continuous, piezoelectric, or thermal. Therefore, depending on the specific ink process, the inks may contain widely differing amounts and combinations of solvents, colorants, preservatives, surfactants, and humectants. Inks preferred for use in combination with the image recording elements of the present invention are water based, such as those currently sold for use in the Hewlett-Packard Desk Writer 560C printer. However, it is intended that alternative embodiments of the image recording elements as described above, which may be formulated for use with inks which are specific to a given ink recording process or to a given commercial vendor, fall within the scope of the present invention.

Smooth opaque bases are useful in combination with silver halide images because the contrast range of the silver halide image is improved, and show through of ambient light during image viewing is reduced. The preferred photographic element of this invention is directed to a silver halide photographic element capable of excellent performance when exposed by either an electronic printing method or a conventional optical printing method. An electronic printing method comprises subjecting a radiation sensitive silver halide emulsion layer of a recording element to actinic radiation of at least $10^4$ ergs/cm$^2$ for up to 100μ seconds duration in a pixel-by-pixel mode wherein the silver halide emulsion layer is comprised of silver halide grains as described above. A conventional optical printing method comprises subjecting a radiation sensitive silver halide emulsion layer of a recording element to actinic radiation of at least $10^4$ ergs/cm$^2$ for $10^3$ to 300 seconds in an imagewise mode wherein the silver halide emulsion layer is comprised of silver halide grains as described above. This invention in a preferred embodiment utilizes a radiation sensitive emulsion comprised of silver halide grains (a) containing greater than 50 mole percent chloride based on silver, (b) having greater than 50 percent of their surface area provided by {100} crystal faces, and (c) having a central portion accounting for from 95 to 99 percent of total silver and containing two dopants selected to satisfy each of the following class requirements: (i) a hexacoordination metal complex which satisfies the formula:

$$[ML_6]^n \qquad (I)$$

wherein n is zero, −1, −2, −3, or −4, M is a filled frontier orbital polyvalent metal ion, other than iridium, and $L_6$ represents bridging ligands which may be independently selected, provided that at least four of the ligands are anionic ligands, and at least one of the ligands is a cyano ligand or a ligand more electronegative than a cyano ligand, and (ii) an iridium coordination complex containing a thiazole or substituted thiazole ligand. Preferred photographic imaging layer structures are described in EP Publication 1 048 977. The photosensitive imaging layers described therein provide particularly desirable images on the base of this invention. This invention may also include a photographic recording element comprising a support and at least one light sensitive silver halide emulsion layer comprising silver halide grains as described above.

The following examples illustrate the practice of this invention. They are not intended to be exhaustive of all possible variations of the invention. Parts and percentages are by weight unless otherwise indicated.

EXAMPLES

Sample 1 (Control):

A typical photographic paper base of approximately 160 g/m$^2$ of photo quality paper was coated with 26 g/m$^2$ of pigmented low density polyethylene (0.917 g/cc) on the top side with a glossy chill roller with a surface roughness of approximately 0.2 microns. This layer contains approximately 12% by weight of anatase TiO2, an optical brightener and blue tints. On the backside of the paper base was a layer of 28 g/m$^2$ of clear high density (0.924 g/cc) polyethylene. A continuous antistatic layer was coated on the backside polyethylene resin by a gravure coating process.

The paper base was produced using a standard fourdrinier paper machine and a blend of mostly bleached hardwood Kraft fibers. The fiber ratio consisted primarily of bleached poplar (38%) and maple/beech (37%) with lesser amounts of birch (18%) and softwood (70%). Fiber length was reduced from 0.73 mm length weighted average as measured by a Kajaani FS-200 to 0.55 mm length using high levels of conical refining and low levels of disc refining. Fiber lengths from the slurry were measured using a FS-200 Fiber Length Analyzer (Kajaani Automation Inc.). Energy applied to the fibers indicated by the total Specific Net Refining Power (SNRP), for this example was 127 KW hr/metric ton. Two conical refiners were used in series to provide the total conical refiners SNRP value. This value was obtained by adding the SNRPs of each conical refiner. Two disc refiners were similarly used in series to provide a total Disk SNRP. Neutral sizing chemical addenda, utilized on a dry weight basis, included alkyl ketene dimer at 0.20% addition, cationic starch (1.0%), polyaminoamide epichlorhydrin (0.50%), polyacrylamide resin (0.18%), diaminostilbene optical brightener (0.20%), and sodium bicarbonate. Surface sizing using hydroxyethylated starch and sodium chloride was also employed. In the third dryer section, ratio drying was utilized to provide a moisture bias from the face side to the wire side of the sheet. The top or face side (emulsion side) of the sheet was then remoisturized with conditioned steam immediately prior to calendering. Sheet temperatures were raised to between 76° C. and 93° C. just prior to and during calendering. The paper was then calendered to an apparent density of 1.17. Moisture levels after the calender were 7.0% to 9.0% by weight.

Sample 2 (Control): Foam Base with Flange Layer

A closed cell polypropylene foam of caliper 6.0 mil and density 0.53 g/cm$^3$ was obtained from Berwick Industries, Berwick, Pa. This foam was extrusion resin coated on both sides using a flat sheet die. The upper flange or polymer layer on the face side of the foam was made from two different blends, which were coextrusion coated to form a single flange layer, against the same chill roller surface as used in sample 1. The layer closer to the foam was coated at 14 g/m$^2$ coverage, at a melt temperature of 525° F., and comprised approximately 10% anatase $TiO_2$, 20% Mistron CB Talc (from Luzenac America), 20% PA609 (amorphous organic polymer from Exxon Mobil) and 50% PF611 (polypropylene homopolymer—extrusion coating grade from Basell). The skin layer, or layer coated furthest from the foam core, was coated at 12 g/m$^2$ coverage, at a melt temperature of 300 C, and comprised approximately 18% $TiO_2$, 4.5% ZnO, and 78.5% D4002 P (low density polyethylene from Eastman Chemical Company). The lower flange or polymer layer on the wire side of the foam was monoextrusion coated at 300 C melt temperature. The lower flange coating was at 28 g/m$^2$ coverage and comprised approximately 10% anatase $TiO_2$, 20% Mistron CB Talc, 20% PA609 and 50% PF611. The melt extruder polypropylene was extruded from a coathanger flat sheet die. The polymer was extruded into a nip formed by a chill roller and a pressure roller with the polypropylene foam core sheet being the primary web substrate that was against the pressure roller and the molten polypropylene flange against the chill roller surface.

Sample 3 (Control): Foam Base with Flange Layer

Sample 3 was prepared the same as sample 2 except the topcoated layer was coated at 48 g/m$^2$ as opposed to 26 g/m$^2$.

Sample 4 (Invention)

This sample was prepared the same as sample 2 except the 6 mil closed cell foam core was coated with a pigmented latex formula polymeric smoothing layer using a blade coater prior to applying the resin layers. The pigmented latex was an acrylic polymer emulsion (Joncryl 678) manufactured by Johnson Polymer, Inc. A dispersion of TiO2 (Dupont T-Pure R960) was added with a dispersing aid (0.02% tetrasodium pyrophosphate) to minimize pigment clumping. A 70% dispersion slurry was prepared using high shear mixing. The dispersed slurry was mixed with the latex. The weight ratio was approximately 55/45 parts latex to pigment. The pigment/latex dispersion was applied at a coat weight of approximately 25 g/m$^2$ and then heat dried to remove the water. After the foam core was dried, it was resin coated as in sample 2 except the total top side coextruded polymer weight was 26 g/m$^2$, of which 10 g/m$^2$ was a top skin layer of polyethylene and 16 g/m$^2$ of polypropylene was between the polyethylene and the latex pigment coating on the foam core.

Evaluation

Pits were evaluated by selecting random areas of the samples and visually looking for pits under a microscope using low angle lighting to create a shadow effect from the wall of the pit. For roughness or Ra values, a Gould Microtopographer stylus instrument was used, utilizing a diamond stylus with a light load of 50 mg to avoid surface damage. The roughness average Ra of the skin layer is determined, as per ASME B46.1-1995. The roughness average, Ra, is the arithmetic average of the absolute values of the profile height deviations recorded within the evaluation length and measured from the mean line. Ra values are expressed in μm or microns.

As noted in Table 1, Control sample 1 is a standard photographic sheet, that has a Ra of 5.5 after it has been resin coated, with very little or no pits observable. Control sample 2 is a polypropylene foam core that has a very high roughness prior to being flange coated with a melt extrusion layer. Even after coating with 48 g/m$^2$ of polymeric flange material, the roughness is still very high resulting in a high level of pits on the surface. Sample 3 used the same foam core as Control sample 2 and Inventive sample 4, but required over 75 g/m$^2$ to reduce the pit level. Sample 4 used the same foam core as Control sample 2, but it was coated with a latex/pigment formula polymeric smoothing layer prior to flange coating. As noted, the surface roughness was much smoother both before and after resin coating resulting in a base without pits.

TABLE 1

| Sample | Core Mat'l | Core Ra (microns) | Smoothing Layer | Smoothing Layer Ra (Microns) | Flange Coverage (grams/m$^2$) | Flange + Core Ra (Microns) | Craters (PITS) |
|---|---|---|---|---|---|---|---|
| 1 (Control) | Paper | 0.76 | None | NA | 26 | 0.14 | Very low to none |
| 2 (Control) | Foam | 2.5 | None | NA | 26 | 1.5 | High |
| 3 (Control) | Foam | 2.5 | None | NA | 48 | 0.33 | Some |
| 4 | Foam | 2.5 | Yes | 0.2 | 26 | 0.1 | None |

In summary, a foam cored material is desired which has smoothness equivalent to the smoothness of conventional photographic paper. The application of polymeric flange layers at typical resin coating coverage as demonstrated by sample 2 does not provide a surface smoothness that it free of pits. Even at increased flange coverages the smoothness of the foam core is not equivalent to conventional paper base and therefore has some pits as shown in sample 3. However, the application of the polymeric smoothing layer of the present invention to the foam core results in a support as shown by sample 4, which demonstrates performance superior to conventional paper support.

The invention has been described in detail with particular reference to certain preferred embodiments thereof, but it will be understood that variations and modifications can be effected within the spirit and scope of the invention.

The invention claimed is:

1. An imaging element comprising at least one imaging layer and a base wherein said base comprises a foam core layer and at least one polymeric surface smoothing layer, and wherein said closed cell foam core layer comprises a polymer that has been expanded through the use of a blowing agent, and wherein said at least one polymeric smoothing layer comprises a solution polymer of butadiene and co-polymers thereof.

2. The imaging element of claim 1 wherein said polymer that has been expanded through the use of a blowing agent comprises at least one homopolymer that has been expanded through the use of a blowing agent.

3. The imaging element of claim 2 wherein said homopolymer that has been expanded through the use of a blowing agent comprises at least one member selected from the group consisting of polyolefin, polystyrene, polyvinylchloride, polyurethanes, polyisocyanurates, and copolymers thereof.

4. The imaging element of claim 2 wherein said homopolymer that has been expanded through the use of a blowing agent comprises polyolefin.

5. The imaging element of claim 2 wherein said homopolymer that has been expanded through the use of a blowing agent comprises polystyrene.

6. The imaging element of claim 2 wherein said homopolymer that has been expanded through the use of a blowing agent comprises polyurethanes.

7. The imaging element of claim 1 wherein said at least one smoothing layer comprises an aqueous solution polymer.

8. The imaging element of claim 1 wherein said solution polymer comprises monomer units derived from oleophilic monomers.

9. The imaging element of claim 1 wherein said closed cell foam core has at least two sides and said at least one polymeric smoothing layer is applied to at least one side of said at least two sides of said closed cell foam core.

10. The imaging element of claim 1 wherein said polymeric smoothing layer further comprises at least one pigment.

11. The imaging element of claim 10 wherein said pigment comprises at least one member selected from the group consisting of TiO2, BaSO4, clays, talcs, CaCO3, ZnO, and Al2O3.

12. The imaging element of claim 1 wherein said polymeric smoothing layer further comprises at least one addenda selected from the group consisting of colorants, optical brighteners, foam control agents, viscosity modifiers, crosslinking agents, antioxidants.

13. The imaging element of claim 1 wherein said foam core layer comprises polyolefin.

14. The imaging element of claim 13 wherein said polyolefin comprises polyethylene or polypropylene.

15. The imaging element of claim 1 wherein said blowing agent comprises a mechanical, chemical, or physical agent.

16. The imaging element of claim 15 wherein said blowing agent comprises sodium bicarbonate/citric acid mixtures, or azodicarbonamide.

17. The imaging element of claim 1 wherein said foam core layer further comprises organic or inorganic fillers.

18. The imaging element of claim 1 wherein said foam core layer further comprises at least one member selected from the group consisting of an auxiliary foaming agent, nucleating agent, and a crosslinking agent.

19. The imaging element of claim 1 wherein said foam core layer has a thickness of from 25 to 200 μm.

20. The imaging element of claim 1 wherein said foam core layer has an opacity greater than 90%.

21. The imaging element of claim 1 further comprising at least one flange layer.

22. The imaging element of claim 21 wherein said at least one flange layer comprises a polymer sheet.

23. The imaging element of claim 21 wherein said flange layer comprises at least one high modulus polymer selected from the group consisting of high-density polyethylene, polypropylene, polystyrene, their blends or their copolymers.

24. The imaging element of claim 22 wherein said polymer sheet is formed integrally with said foam core layer.

25. The imaging element of claim 22 wherein said polymer sheet comprises a biaxially oriented polyolefin sheet.

26. The imaging element of claim 21 wherein said polymeric smoothing layer is located between said foam core layer and said flange layer.

27. The imaging element of claim 21 wherein said flange layer is located between said foam core layer and said polymeric smoothing layer.

28. The imaging element of claim 21 wherein said flange layer further comprises inorganic or organic filler.

29. The imaging element of claim 28 wherein said fillers comprise talc, mica, and calcium carbonate.

30. The imaging element of claim 21 wherein said flange layers have a caliper of from 10 μm to 150 μm.

31. The imaging element of claim 21 wherein said flange layers have a caliper of from 35 μm to 70 μm.

32. The imaging element of claim 21 wherein said flange layer has an opacity greater than 90%.

33. The imaging element of claim 1 wherein the upper surface of said base has an average roughness of from 0.1 μm to 1.1 μm.

34. The imaging element of claim 1 wherein said base has opacity greater than 90%.

35. The imaging element of claim 1 wherein said base has a thickness of from 100 to 400 μm.

36. The imaging element of claim 1 wherein said imaging layer comprises at least one photosensitive silver halide layer.

37. The imaging element of claim 1 wherein said imaging layer comprises an ink jet receiving layer.

38. The imaging element of claim 1 wherein said imaging layer comprises a thermal dye receiving layer.

39. The imaging element of claim 1 wherein said imaging element further comprises at least one inorganic pigment.

40. The imaging element of claim 39 wherein said pigment is selected from the group consisting of $TiO_2$, $CaCO_3$, clay, and talc.

* * * * *